(12) United States Patent
Gatley (10) Patent No.: US 9,920,444 B2
(45) Date of Patent: Mar. 20, 2018

(54) CO-BONDED ELECTROFORMED ABRASION STRIP

(71) Applicant: THE BOEING COMPANY, Chicago, IL (US)

(72) Inventor: Christopher M. Gatley, Chicago, IL (US)

(73) Assignee: The Boeing Company, Chicago, IL (US)

( * ) Notice: Subject to any disclaimer, the term of this patent is extended or adjusted under 35 U.S.C. 154(b) by 723 days.

(21) Appl. No.: 14/285,376

(22) Filed: May 22, 2014

(65) Prior Publication Data

US 2015/0337447 A1 Nov. 26, 2015

(51) Int. Cl.
*C25D 1/00* (2006.01)
*C22C 38/00* (2006.01)
(Continued)

(52) U.S. Cl.
CPC .............. *C25D 1/003* (2013.01); *B32B 15/01* (2013.01); *B32B 15/013* (2013.01); *B32B 15/015* (2013.01); *B64C 27/473* (2013.01); *C22C 19/03* (2013.01); *C22C 38/00* (2013.01); *C25D 1/00* (2013.01); *C25D 5/12* (2013.01); *C25D 5/36* (2013.01); *C25D 5/40* (2013.01); *C25D 7/00* (2013.01); *C25D 7/0614* (2013.01); *B64C 2027/4733* (2013.01); *C23C 18/1657* (2013.01);
(Continued)

(58) Field of Classification Search
CPC ............ C25D 1/003; C25D 5/40; C25D 5/36; C25D 7/0614; B64C 27/473; B64C 2027/4733; B32B 15/015; B32B 15/01
See application file for complete search history.

(56) References Cited

U.S. PATENT DOCUMENTS 4,314,892 A 2/1982 Stevens
5,935,407 A 8/1999 Nenov et al.
(Continued)

FOREIGN PATENT DOCUMENTS

EP 1365107 A1 11/2003
GB 2449862 A 12/2008
WO WO 2014/145588 9/2014

OTHER PUBLICATIONS

GB Search and Examination Report, Application No. GB1508768.7, dated Feb. 26, 2016.

*Primary Examiner* — Louis J Rufo
(74) *Attorney, Agent, or Firm* — Haynes and Boone, LLP (57) ABSTRACT

A system, method, and apparatus for a co-bonded electroformed abrasion strip are disclosed. A disclosed method for making a unitary abrasion strip for a fluid dynamic surface includes manufacturing or identifying a first metallic section having an overlap region on a first end of the first metallic section. The method further includes manufacturing or identifying an overlap region disposed on the first end of the first metallic section by preparing the first end of the first metallic section. Also, the method includes creating a second metallic section onto the overlap region on the first end of the first metallic section by performing a first electro-deposition process on the first end of the first metallic section; where the first metallic section, the overlap region, and the second metallic section together form a unitary, inseparable abrasion strip for a fluid dynamic surface.

10 Claims, 8 Drawing Sheets

(51) Int. Cl.

| | |
|---|---|
| *C22C 19/03* | (2006.01) |
| *B32B 15/01* | (2006.01) |
| *C25D 7/00* | (2006.01) |
| *C25D 5/12* | (2006.01) |
| *B64C 27/473* | (2006.01) |
| *C25D 5/36* | (2006.01) |
| *C25D 5/40* | (2006.01) |
| *C25D 7/06* | (2006.01) |
| *C23C 18/16* | (2006.01) |

(52) U.S. Cl.
CPC .................. *Y10T 428/12806* (2015.01); *Y10T 428/12944* (2015.01); *Y10T 428/12951* (2015.01); *Y10T 428/12972* (2015.01)

(56) References Cited

U.S. PATENT DOCUMENTS

| | | | |
|---|---|---|---|
| 2010/0014964 A1* | 1/2010 | Smith | ............ C23C 30/00 |
| | | | 415/200 |
| 2012/0114956 A1 | 5/2012 | Hiroyuki et al. | |
| 2016/0002803 A1* | 1/2016 | Sklar | ............ C25D 5/14 |
| | | | 428/621 |

* cited by examiner

CO-BONDED ELECTROFORMED ABRASION STRIP

FIELD

The present disclosure relates to abrasion strips. In particular, it relates to co-bonded electroformed abrasion strips.

BACKGROUND

Rotorcraft aerodynamic surfaces are generally equipped with metallic leading edge erosion/abrasion protection devices. Current solutions typically use multi-piece designs with mechanically formed or machined parts used for simple geometric areas, and with electroformed parts for more complex geometries, which make roll-forming or machining either impossible with current capabilities or cost-prohibitive. Then, the mechanically formed or machined pieces are joined together with the electroformed pieces with the use of adhesive bonds or other means. These solutions present problems for joining the separate pieces in order to achieve a continuous erosion/abrasion resistant surface as well as to achieve adequate structural strength and reliability against fatigue failures at the adhesive bond connections.

As such, there is a need for an improved metallic leading edge erosion/abrasion protection device design.

SUMMARY

The present disclosure relates to a method, system, and apparatus for a co-bonded electroformed abrasion strip. In one or more embodiments, a method for making a unitary abrasion strip for a fluid dynamic surface involves manufacturing or identifying a first metallic section having an overlap region on one end of the first metallic section. The method further involves manufacturing or identifying an overlap region disposed on the first end of the first metallic section by preparing the first end of the first metallic section. Also, the method involves creating a second metallic section onto the overlap region on the one end of the first metallic section by performing a first electro-deposition process on the one end of the first metallic section; where the first metallic section, the overlap region, and the second metallic section together form a unitary, inseparable abrasion strip for a fluid dynamic surface.

In one or more embodiments, the act of manufacturing or identifying an overlap region comprises performing a second electro-deposition process to deposit a first metal on at least a portion of the first end of the first metallic section to create the overlap region; decontaminating at least the portion of the first metallic section to remove one or more contaminants; and/or preparing the at least the portion of the first metallic section to manufacture the overlap region for receiving the second metallic section. In at least one embodiment, the second electro-deposition process comprises an electroplating process. In some embodiments, the first metal comprises nickel and/or a nickel-cobalt based alloy.

In at least one embodiment, the first metallic section comprises an iron-based alloy or a titanium-based alloy. In some embodiments, the second metallic section comprises nickel, a nickel-based alloy, or a nickel-cobalt based alloy. In one or more embodiments, the first electro-deposition process comprises an electroforming process.

In one or more embodiments, the first metallic section is manufactured or identified to a first geometric profile that substantially conforms to a first portion of the fluid dynamic surface, the second metallic section is manufactured to have a second geometric profile that substantially conforms to a second portion of the fluid dynamic surface, and the fluid dynamic surface comprises one or more surfaces on a rotatory blade that converts energy from fluid flow into propulsion power for a craft having the rotatory blade. In at least one embodiment, the rotatory blade comprises a rotorcraft blade, an impeller blade, or a windmill blade.

In at least one embodiment, the second metallic section is created onto the first metallic section and has a complex geometric profile that is fabricated within a tolerance range between less than ten nanometers to tens of micro-meters.

In one or more embodiments, a unitary abrasion strip for a fluid dynamic surface comprises a first metallic section comprising a first geometric profile. The unitary abrasion strip further comprises an overlap region that includes a first portion of the first metallic section or is inseparably disposed on the first metallic section. Also, the unitary abrasion strip comprises a second metallic section that is disposed on at least a part of the overlap region by using a first electro-deposition process; where the first metallic section, the overlap region, and the second metallic section together form a unitary, inseparable abrasion strip for a fluid dynamic surface.

In at least one embodiment, the first metallic section comprises a first geometric profile that substantially conforms to at least a first part of a fluid dynamic surface, and the second metallic section comprises a second geometric profile that substantially conforms to at least a second part of the fluid dynamic surface. In some embodiments, the first electro-deposition process includes an electroforming process. In one or more embodiments, the overlap region or the first portion of the overlap region is manufactured by using at least a second electro-deposition process that includes an electro-plating process.

In one or more embodiments, the first metallic section comprises an iron-based alloy and/or a titanium-based alloy. In at least one embodiment, the first metal comprises nickel, a nickel-based alloy, or a nickel-cobalt based alloy. In at least one embodiment, at least a portion of the unitary, inseparable abrasion strip is further manufactured by creating a layer of abrasion resistant material on the portion of the unitary, inseparable abrasion strip. In some embodiments, the fluid dynamic surface includes one or more surfaces on a rotatory blade that converts energy from fluid flow into propulsion power for a craft having the rotatory blade. In one or more embodiments, the rotatory blade comprises a rotorcraft blade, an impeller blade, or a windmill blade. In one or more embodiments, the second metallic section includes a complex geometric profile that is fabricated with the first electro-deposition process within a tolerance range between less than ten nanometers to tens of micrometers.

The features, functions, and advantages can be achieved independently in various embodiments of the present inventions or may be combined in yet other embodiments.

BRIEF DESCRIPTION OF THE DRAWINGS

The drawings illustrate the design and utility of various embodiments of the invention. It should be noted that the figures are not drawn to scale and that elements of similar structures or functions are represented by reference numerals throughout the figures. In order to better appreciate how to obtain the above-recited and other advantages and objects of various embodiments of the invention, a more detailed description of various embodiments briefly described above will be rendered by reference to specific embodiments thereof, which are illustrated in the accompanying drawings.

Understanding that these drawings depict only typical embodiments of the invention and are not therefore to be considered limiting of its scope, the invention will be described and explained with additional specificity and detail through the use of the accompanying drawings in which.

DETAILED DESCRIPTION

The methods and apparatus disclosed herein provide an operative system for unitary electroformed abrasion strips. The disclosed system provides a metallic leading edge erosion and/or abrasion protection device (e.g. an abrasion strip) that provides a continuous erosion and/or abrasion resistant surface as well as adequate structural strength and reliability. In particular, the disclosed metallic leading edge erosion and/or abrasion protection device may be formed by a combination of electroplating and electroforming in some embodiments.

As previously described above, rotorcraft aerodynamic surfaces or other fluid dynamic surfaces of rotary blades may generally be equipped with metallic leading edge erosion/abrasion protection devices. Current solutions employed typically use multi-piece designs with mechanically formed or machined parts used for simple geometric areas, and with electroformed parts for more complex geometries, with the two being joined together with adhesive bonds or other means. These solutions, which join the separate pieces with adhesive bonds, have problems achieving a continuous erosion/abrasion resistant surface and have problems achieving adequate structural strength and reliability against fatigue failures at the adhesive bond connections.

Specifically, the present disclosure describes a unitary abrasion strip that may be created by electro-deposition (e.g. an electroforming process) a metallic extension onto a metallic substrate. In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 1A:
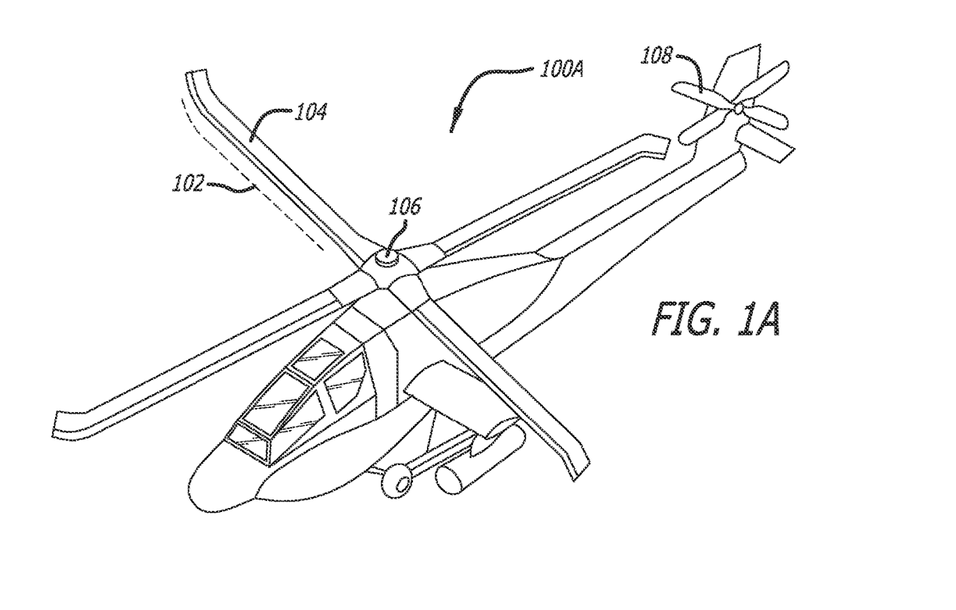
FIG. 1A shows a schematic diagram of an illustrative rotorcraft (e.g., a helicopter) that may employ the disclosed unitary abrasion strip for its rotary blades, in accordance with at least one embodiment of the present disclosure.

FIG. 1A shows a schematic diagram of an illustrative rotorcraft (e.g., a helicopter) that may employ the disclosed unitary abrasion strip for its rotary blades, in accordance with at least one embodiment of the present disclosure. More specifically, the helicopter 100A includes a rotor having a plurality of rotor blades 104 rotating or spinning about the rotor head 106. The helicopter 100A may also include a tail rotor having a plurality of tail rotor blades 108. During operation, the rotor blades and the tail rotor blades rotate or spin to slice through the air and thus may be subjected to abrasion from air, sand, debris, water (e.g., rain), snow, ice, or other particulates in the air. Abrasion causes undesirable effects of wear and tear or roughing the surface finish of the fluid dynamic surfaces. Consequently, the leading edges, which suffer more severely from abrasion than the trailing edge, of fluid dynamic surfaces are usually protected with abrasion resistant materials to reduce the erosion rate or to maintain the fluid dynamic behavior of these fluid dynamic surfaces. For example, abrasion resistance strips may be used to protect a portion of the helicopter's rotor blades around their respective leading edges 102 or a portion of the tail rotor blades around their respective leading edges.

Figure 1B:
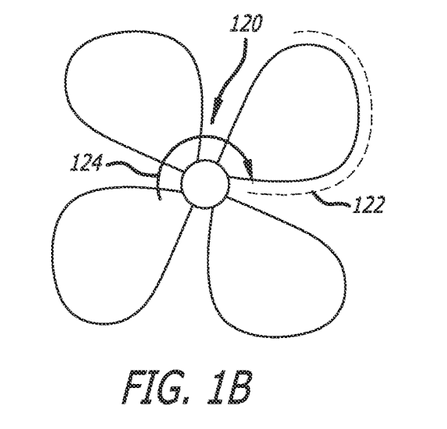
FIG. 1B shows a diagram of an illustrative impeller (e.g., a propeller as shown) that may employ the disclosed unitary abrasion strip for its rotary blades, in accordance with at least one embodiment of the present disclosure.

FIG. 1B shows a diagram of an illustrative impeller (e.g., a propeller as shown) that may employ the disclosed unitary abrasion strip for its rotary blades, in accordance with at least one embodiment of the present disclosure. It shall be noted that although a propeller of a watercraft is shown in FIG. 1B, the impeller may include various turbines, fans, or other similar devices that are used to increase the pressure or flow of a fluid (e.g., air, other types of gases, water, or seawater), in addition to the propeller of a watercraft shown in FIG. 1B. During operation, the illustrated propeller 120 of a watercraft may be subjected to water, sand, debris, plants, animals, ice, or other particulates in the medium (water). Similar to the rotor blades, the blades of the propeller 120 may also suffer wear and tear or roughing of the fluid dynamic surfaces. Consequently, the leading edges of the fluid dynamic surfaces may also be protected with abrasion resistant materials to reduce the erosion rate or to maintain the fluid dynamic behavior of these fluid dynamic surfaces. For example, abrasion resistant strips may also be used to protect a portion of the helicopter's rotor blades around their respective leading edges 122 of the propeller 120, given the direction of rotation 124 as shown in FIG. 1B.

Figure 1C:
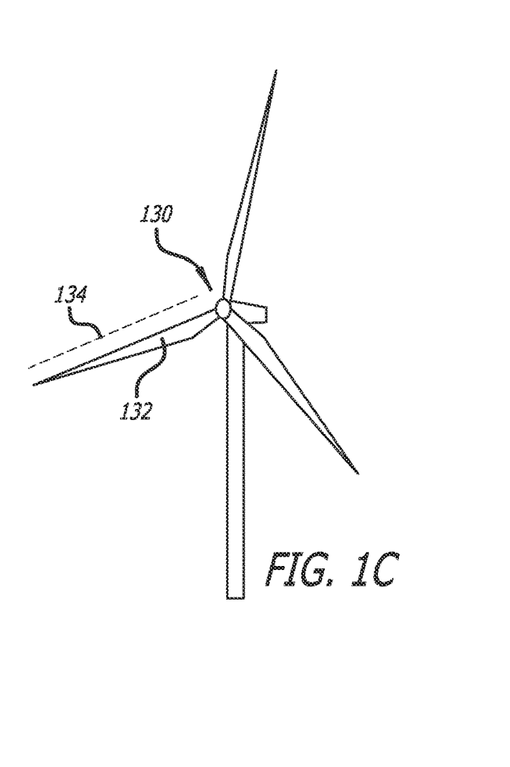
FIG. 1C shows a diagram of an illustrative impeller (e.g., a propeller as shown) that may employ the disclosed unitary abrasion strip for its rotary blades, in accordance with at least one embodiment of the present disclosure.

FIG. 1C shows a diagram of an illustrative impeller (e.g., a propeller as shown) that may employ the disclosed unitary abrasion strip for its rotary blades, in accordance with at least one embodiment of the present disclosure. Although windmills usually rotate at relatively slower speeds than, for example, rotorcraft blades or turbines, the windmill blades 132 of a windmill 130 may also suffer from abrasion in a similar manner as the rotor blades or tail rotor blades of a helicopter and thus may be protected with abrasion resistant strips around the leading edges 134. It shall be noted that FIGS. 1A-C illustrate some applications or use cases of the methods and apparatuses described in this application and are not intended to limit the scope of claims or the scope of other embodiments employing the same or substantially similar variations of the methods or apparatuses described herein, unless otherwise explicitly recited or claimed.

Figure 2A:
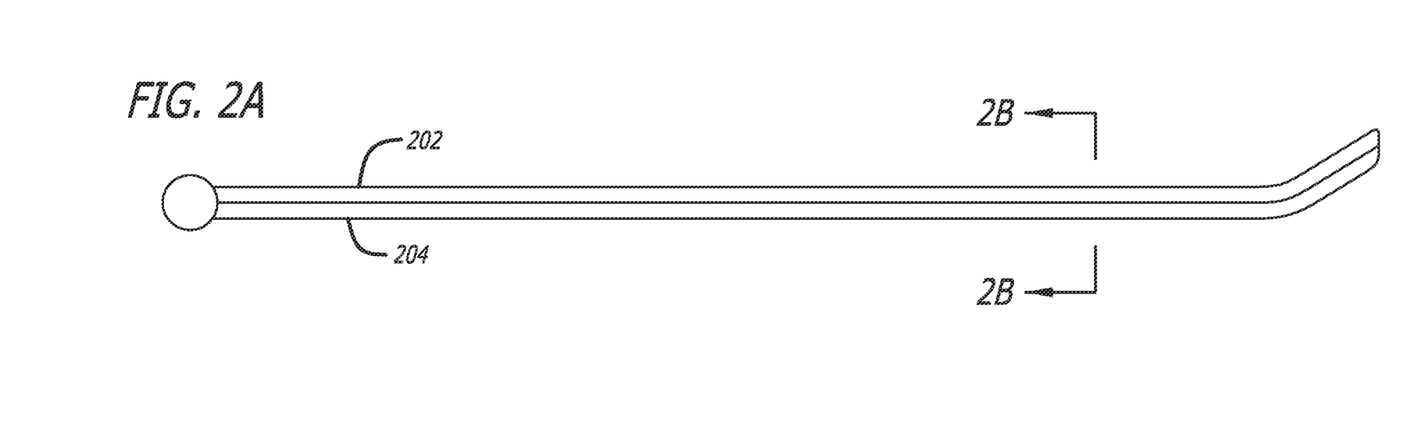
FIG. 2A illustrates a simplified, schematic side view of one of the rotary blades of the rotorcraft of FIG. 1A, where the rotary blade is shown to include an abrasion strip, in accordance with at least one embodiment of the present disclosure.
Figure 2B:
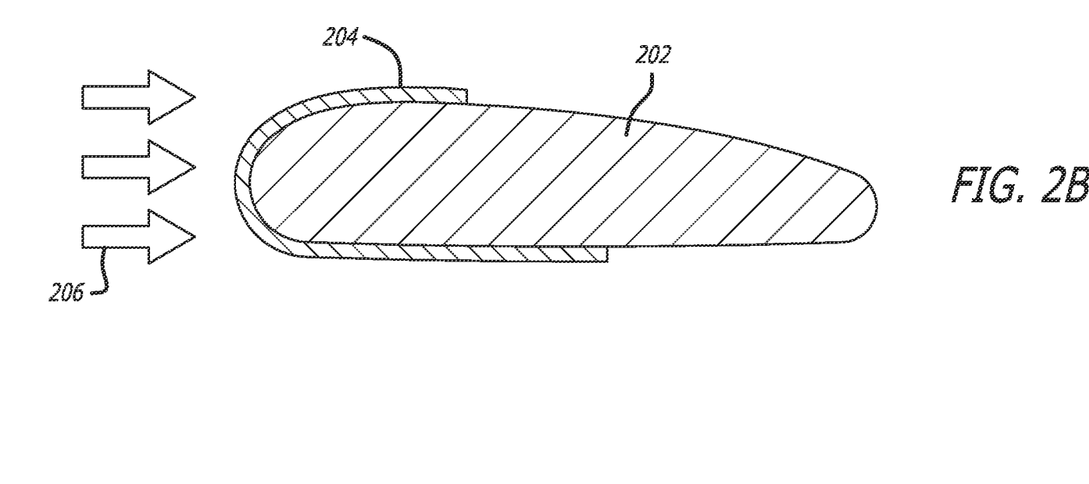
FIG. 2B illustrates a simplified, schematic end view of the rotary blade of FIG. 2A, where the rotary blade is shown to include an abrasion strip, in accordance with at least one embodiment of the present disclosure.

FIG. 2A illustrates a simplified, schematic view of one of the rotary blades of the rotorcraft of FIG. 1A, where the rotary blade is shown to include an abrasion strip, in accordance with at least one embodiment of the present disclosure. FIG. 2B illustrates a simplified, schematic end view of the rotary blade of FIG. 2A, where the rotary blade is shown to include an abrasion strip, in accordance with at least one embodiment of the present disclosure. More specifically, FIG. 2A illustrates a top view of a blade 202 (e.g., a rotor blade of a rotorcraft) having an abrasion resistant strip 204 attached to the blade. A cross-sectional view 2B-2B across the blade assembly is shown in FIG. 2B. FIG. 2B illustrates the cross-sectional view 2B-2B across the blade assembly illustrated in FIG. 2A. As it can be seen in FIG. 2B, the leading edge of the blade 202 with the flow in the direction 206 as shown is protected by the abrasion resistant strip 204. It shall be noted that the shape and size of the abrasion strip 204 in both FIGS. 2A and 2B are not drawn to scale for explanation purposes only, and that the actual shape and size of the abrasion resistant strip may vary according to at least the fluid dynamic surfaces of the blade 202 that need protection against abrasion.

Figure 3A:
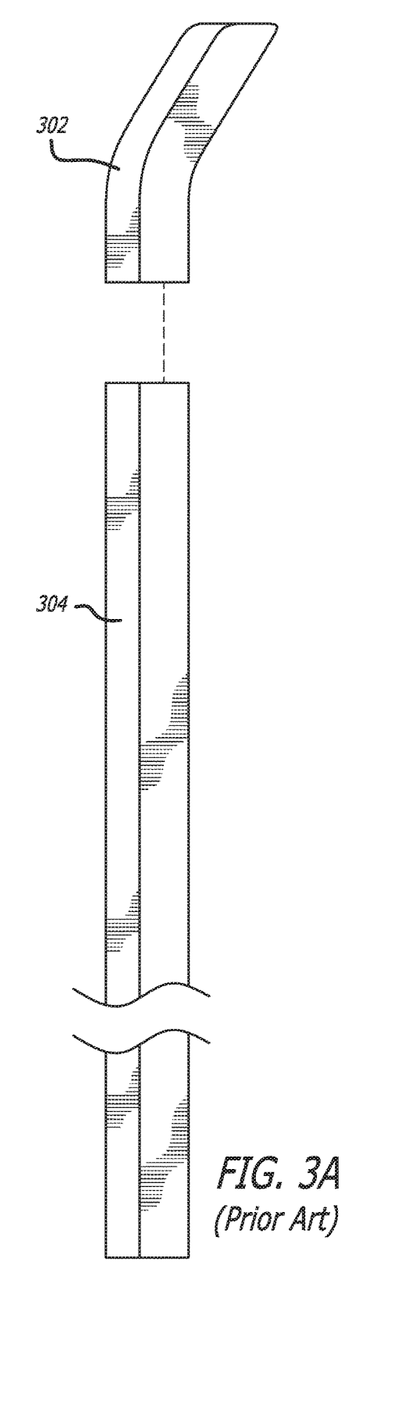
FIGS. 3A-B illustrate schematic diagrams for the formation of a conventional abrasion strip.
Figure 3B:
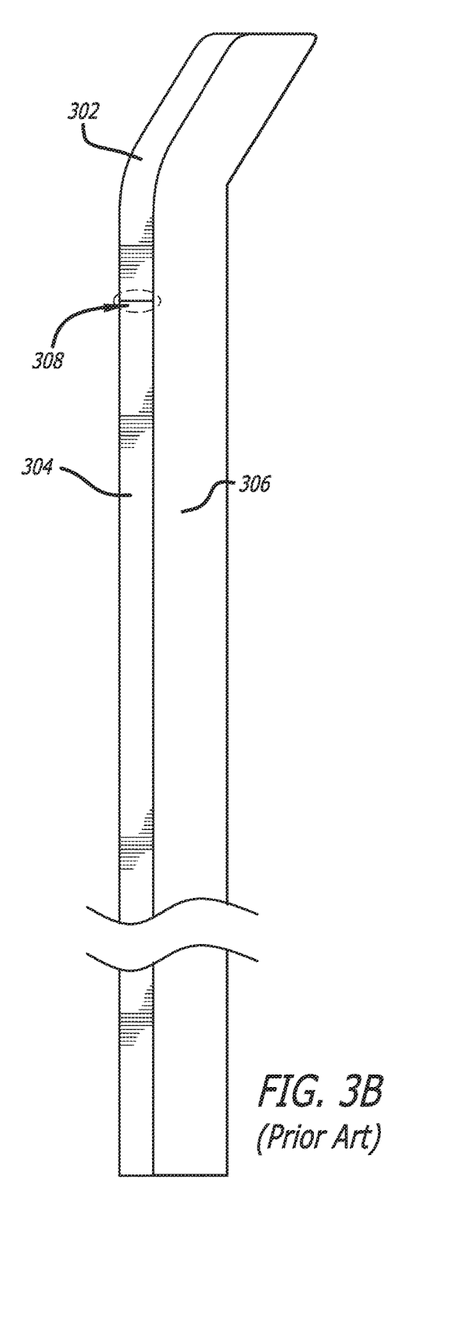

FIGS. 3A-B illustrate schematic diagrams for the formation of a conventional abrasion strip. The conventional abrasion strip assembly usually includes multiple components such as a first abrasion strip section 302 and a second abrasion strip section 304. It should be noted that these abrasion strip sections 302 and 304 both have a curved cross section (e.g., the abrasion strip sections 302 and 304 are formed such that they are in a wrap around configuration to wrap around the blade 306 (e.g., refer to abrasion resistant strip 204 in FIG. 2B to view the curved cross section)). These abrasion resistant strip sections 302 and 304 are separately manufactured as, for example, separate metallic sections or separate polymeric sections with inlaid metal (e.g., abrasion resistant tapes). These separately manufactured abrasion resistant strip sections are then separately secured to fluid dynamic surfaces of the blade 306 by using, for example, adhesives, bonding agents, or other mechanical means (e.g., fasteners). For example, conventional methodologies may attach a nickel abrasion resistant strip section 302 to a blade 306 of a composite material by using mechanical fasteners or an appropriate nickel-to-composite bonding agent or adhesive.

These methodologies may separately attach a steel abrasion resistant strip section 304 to the designated portion of the blade 306 by using the appropriate steel-to-composite bonding agent or adhesive. Because the first and the second abrasion resistant strip sections are separately manufactured and assembled to form the blade assembly, a gap thus exists in the area or interface 308 between the first and the second abrasion resistant strip sections to allow these two abrasion resistant strip sections 302 and 304 to be attached to the blade 306. Such a gap introduces discontinuities in the fluid dynamic surface of the finished blade assembly and disturbs or adversely affects the fluid dynamic behavior of the final blade assembly by, for example, causing vortices or turbulent flows that reduce the lift or efficiency of the blade assembly or increase drag. These conventional methodologies may thus attempt to close the gap in the area or interface 308 between the first and the second abrasion resistant strip sections by using appropriate metal jointing methods such as gluing, brazing, welding, etc.

Figure 4A:
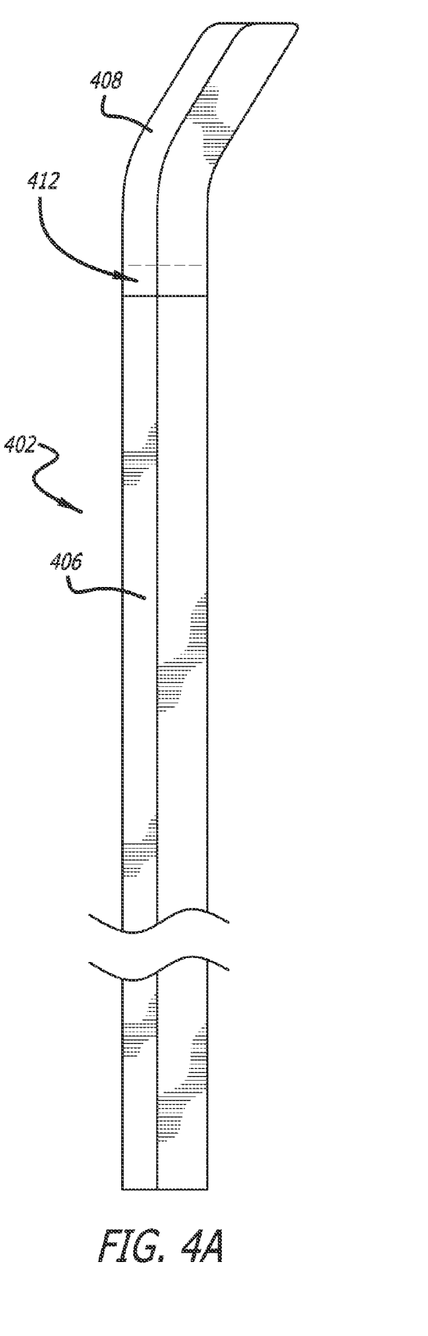
FIG. 4A illustrates an abrasion strip for a fluid dynamic surface in accordance with at least one embodiment described in this application.
Figure 4B:
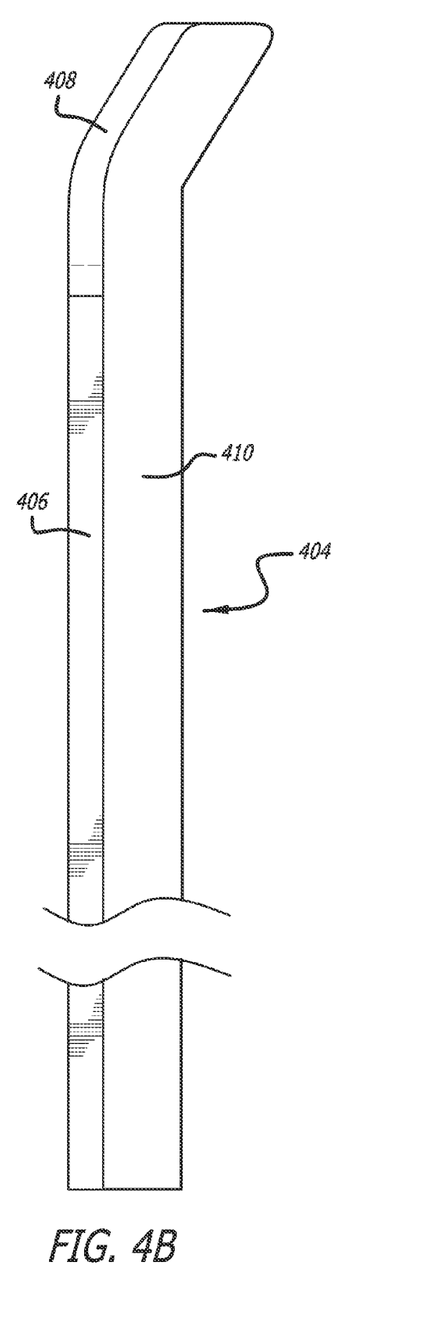
FIG. 4B illustrates a blade assembly including the abrasion strip illustrated in FIG. 4A in accordance with at least one embodiment described in this application.

FIGS. 4A-B illustrate an abrasion strip for a fluid dynamic surface in accordance with at least one embodiment described in this application. More specifically, FIG. 4A illustrates an abrasion resistant strip 402 is manufactured as an inseparable, unitary strip including the first abrasion resistant strip section 406 and the second abrasion resistant strip section 408. The inseparable, unitary strip 402 may thus be separably or inseparably attached to the blade 410 to form the finished blade assembly 404 as illustrated in FIG. 4B which illustrates a finished blade assembly 404 including the abrasion strip 402 illustrated in FIG. 4A in accordance with at least one embodiment described in this application. The region 412 enclosed by dashed lines in FIG. 4A represents an illustrative overlap region on top of which the second abrasion resistant strip 408 is disposed (e.g., the second abrasion resistant strip 408 is shown to be disposed over a portion (denoted by region 412) of the first abrasion resistant strip 406).

One of the advantages of the inseparable, unitary abrasion resistant strip illustrated in FIGS. 4A-B is that the inseparable, unitary abrasion resistant strip may be manufactured in such a way that introduces no discontinuities in the area where the second abrasion resistant strip section 408 joins the first abrasion resistant strip section 406. As a result, the adverse effects of having discontinuities in the fluid dynamic surfaces introduced by the gap as well as additional discontinuities introduced by probable misalignment between the first and the second abrasion resistant strip sections may be reduced or even completely eliminated. More details about how to manufacture an inseparable, unitary abrasion resistant strip will be described below with reference to FIGS. 6A-C, 7, and 7A.

Figure 5A:
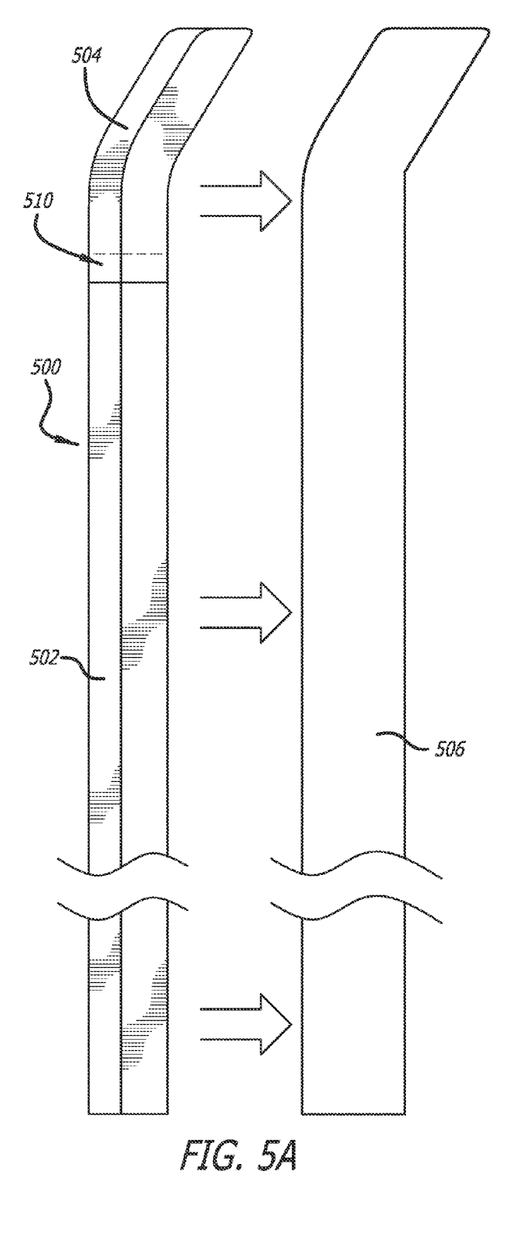
FIGS. 5A-B illustrate schematic diagrams of attaching a unitary abrasion strip to a blade in accordance with at least one embodiment described in this application.
Figure 5B:
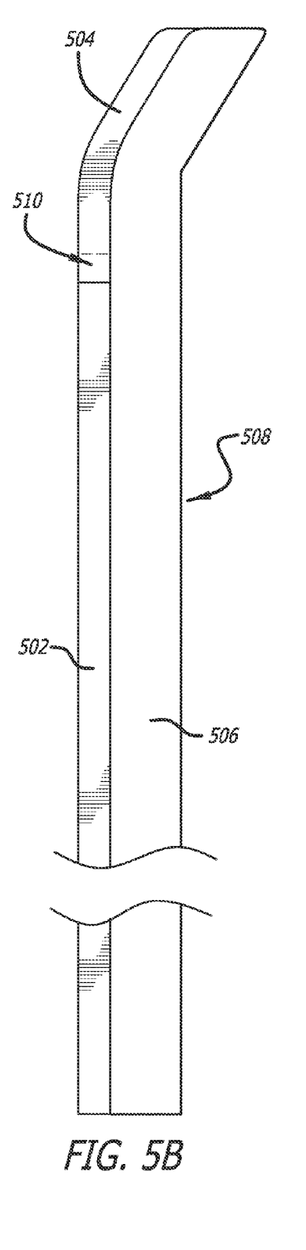

FIGS. 5A-B illustrate schematic diagrams of attaching a unitary abrasion strip to a blade in accordance with at least one embodiment described in this application. More specifically, FIG. 5A illustrates a simplified manufacturing process flow to manufacture a blade assembly having an abrasion resistant strip attached to a blade. An inseparable, unitary abrasion resistant strip 500 is first manufactured to include a first abrasion resistant strip section 502 and a second abrasion resistant strip section 504. Another manufacture or assembly process may inseparably or separably attach the inseparable, unitary abrasion resistant strip 500 to the blade 506. For example, the abrasion resistant strip 500 may be inseparably attached to the blade 506 by using bonding agent(s), adhesives, glue, paste, cement, etc. in some embodiments. FIG. 5B illustrates the manufactured blade assembly having the abrasion resistant strip attached to the blade.

In some other embodiments, the abrasion resistant strip 500 may be separably attached to the blade 506 to form the finished blade assembly 508 by using, for example, mechanical fasteners so that the abrasion resistant strip 500 may be later removed or replaced. The first and the second abrasion resistant strip sections may be made of the same or different materials based at least in part upon, for example, a design choice, operating conditions of the finished blade assembly 508, or other criteria. For example, the abrasion rates may vary along the radial direction of the finished blade assembly 508 due to the rotation of the finished blade assembly 508. Consequently, the tip portion of the finished blade assembly 508 traveling at a higher speed may require or desire a material having higher blade abrasion resistance due to the more severe abrasion near the tip portion.

As another example, the tip portion of the finished blade assembly 508 may have a more complex geometric profile and thus may call for a different manufacturing process (e.g., the electroforming process). In this latter example, the material of choice for the second abrasion resistant strip section 504 may be different from that for the first abrasion resistant strip 502 such that the material for the second abrasion resistant strip 504 is suitable for the manufacturing process. In addition or in the alternative, the material selection for the abrasion resistant strip may be determined based at least in part upon the respective fatigue strengths of the materials. The region 510 enclosed by dashed lines in FIG. 5 represents an illustrative overlap region on top of which the second abrasion resistant strip 504 is disposed.

Figures 6A, 6B:
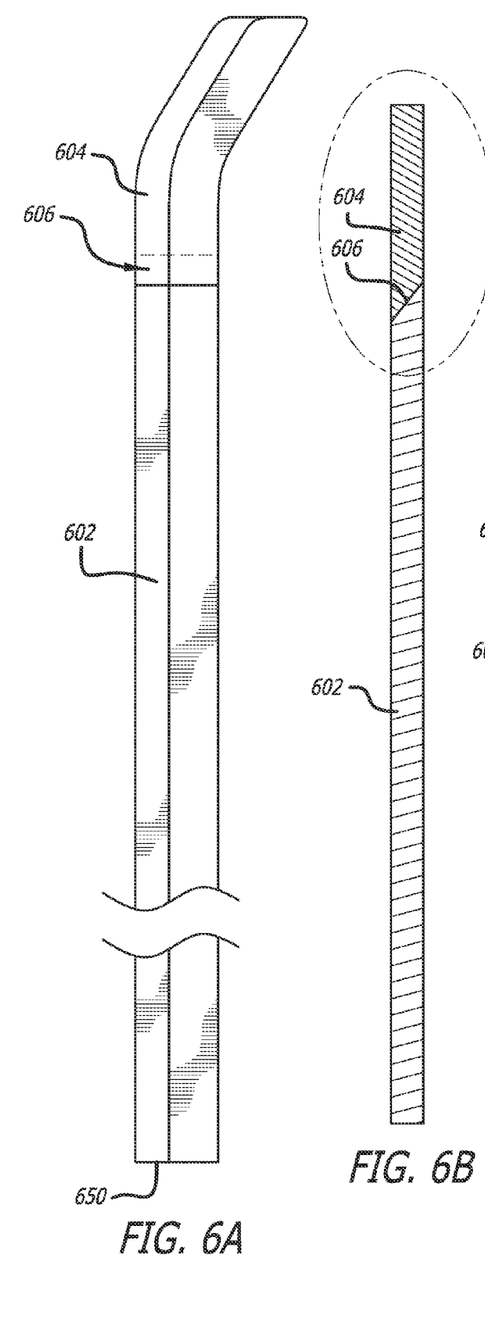
FIGS. 6A-C illustrate schematic diagrams of the formation of a unitary abrasion strip in accordance with at least one embodiment described in this application.
Figure 6C:
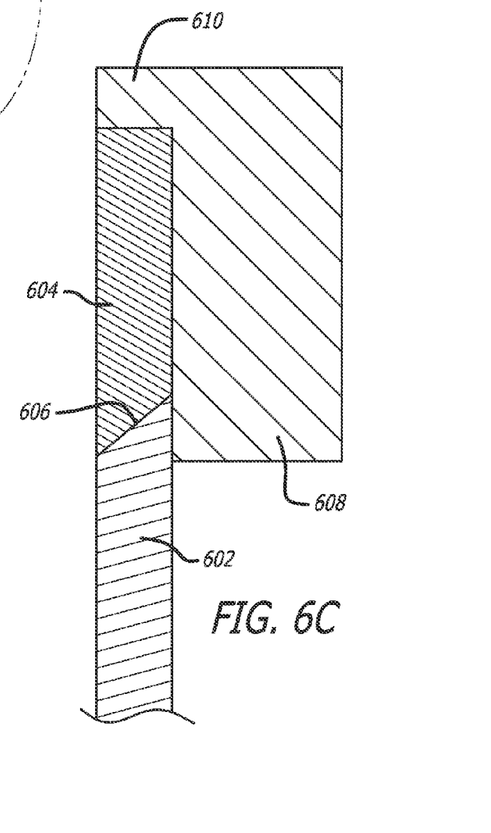

FIGS. 6A-C illustrate schematic diagrams of the formation of a unitary abrasion strip in accordance with at least one embodiment described in this application. More specifically, FIGS. 6A-C illustrate a simplified manufacturing process to demonstrate how an inseparable, unitary abrasion resistant strip may be fabricated in some embodiments. FIG. 6A shows a simplified top view of an inseparable, unitary abrasion resistant strip including a first abrasion resistant strip section 602 and a second abrasion resistant strip section 604. The illustrated inseparable, unitary abrasion resistant strip may be attached to, for example, the leading edge of a fluid dynamic surface. For example, the illustrated inseparable, unitary abrasion resistant strip may be attached to the leading edge of a blade of a rotorcraft with a center of rotation that is situated near the end 650 of the abrasion strip. In some embodiments, the first abrasion resistant strip section 602 and/or the second abrasion resistant strip section 604 may be made of one or more materials that include, for example, steel or Iron-based alloys, Nickel-Cobalt (Ni—Co) alloys including zero (0) to twenty (20) percent of Cobalt, Nickel (Ni), soft Nickel alloys including Iron-Nickel allow (Fe—Ni), hard Nickel alloys including Boron-Nickel (B—Ni) alloys, or any other abrasion or corrosion resistant materials, etc.

In one embodiment, the first abrasion resistant strip section 602 is made of steel or carbon steel, and the second abrasion resistant strip section 604 is made of Nickel via one or more electro-deposition processes and/or an electroless deposition process. The one or more electro-deposition processes may include the electroforming process in some embodiments. In some of these embodiments, the one or more electro-deposition processes may further include the electroplating process. An electro-deposition process is also known as an electrophoretic deposition process during which positively or negatively charged particles dispersed or suspended throughout a liquid medium migrate under the influence of an electrical field and are eventually deposited onto an electrode.

An electro-deposition process may include, for example, an electroforming process or an electro-plating process. The electroforming process is a metal forming process for electroformable metals (e.g., Nickel, some Nickel-based alloys, or other alloys). Electroforming can produce extremely pure metals (e.g., pure Nickel having much higher purity than wrought Nickel) having complex features while holding extreme tolerances ranging from one (1) nanometer to tens or hundreds of micrometers, depending on the design choice. In some embodiments where the second abrasion resistant strip 604 includes complex geometries, the inseparable, unitary abrasion resistant strip may be fabricated by a process that identifies the first abrasion resistant strip section 602 and performs the electroforming process to deposit the second abrasion resistant strip section 606 onto the appropriate portion (e.g., an overlap interface or region 606) of the first abrasion resistant strip section 602.

For example, FIG. 6B illustrates a side view of the abrasion resistant strip illustrated in FIG. 6A. As FIG. 6B shows, the abrasion resistant strip includes the first abrasion resistant strip section 602 and a second abrasion resistant strip 604 that is electroformed on an overlap region 606. In some embodiments, the region where the first abrasion resistant strip section 602 joins the second abrasion resistant strip section 604 (e.g., the overlap region 606) may be first processed by, for example, an electro-plating process or an electroless deposition process. The electro-plating process or the electroless deposition process may be employed for one or more purposes.

For example, the electro-plating process or the electroless deposition process may be used to enhance one or more surface properties of the overlap region 606 of the first abrasion resistant strip section 602 in some embodiments. The one or more surface properties may include, for example, the surface finish, abrasion or wear resistance, bonding or adhesion of heterogeneous materials (e.g., metallic bonding of Nickel to steel), surface finish, etc. in some of these embodiments. The electro-plating process or the electroless deposition process may also be used to build up materials on, for example, the first abrasion resistant strip 602 in some other embodiments. For example, a relative thinner layer of Nickel having a thickness value may be deposited onto the overlap region 608 of the first abrasion resistant strip section 602 for the first abrasion resistant strip section 602 to receive additional Nickel produced by the electroforming process for the second abrasion resistant strip section 604.

FIG. 6C illustrates a schematic close-up view of the overlap region 606. More specifically, FIG. 6C illustrates that the second abrasion resistant strip section 604 may be electroformed onto the overlap region 606 of the first abrasion resistant strip 602 (with or without an intervening electro-plating process or electroless deposition process) with the use of a mandrel 608. The actual design of the mandrel 608 depends on the desired or required dimensions of the second abrasion resistant strip section 604 and/or the overlap region 606. In some embodiments, the actual design of the mandrel 608 may also depend on whether the electroformed second abrasion resistant strip section 604 will undergo one or more additional manufacturing processes. The mandrel may thus include one or more additional features (e.g., one or more additional mandrel features 610) to define certain dimensions (e.g., the dimensions of the tip portion and/or the thickness) of the second abrasion resistant strip section 604. After the electroformed second abrasion strip has been fabricated, the mandrel 608 (and the one or more additional mandrel features 610) may be separated from the electroform, leaving the electroformed abrasion strip. The mandrel 608 may be made of a material including, for example, aluminum to facilitate the removal of the electroformed section from the mandrel itself. The mandrel 608 may also be made of non-conductive material and then sprayed with electrically conductive material (e.g., graphite) in some embodiments. The mandrel 608 may contain a unitary block of material and hence include the one or more additional mandrel features 610 in some embodiments. In some other embodiments, the mandrel 608 may include multiple, separable components that are assembled together for fabricating the second abrasion resistant strip 604 are shown in FIG. 6C. It shall be therefore noted that FIG. 6C is presented for the ease of illustration and explanation purposes and is not intended to limit the scope of various described embodiments or the scope of the claims, unless otherwise specifically recited or claimed. One of the advantages of forming the second abrasion resistant strip section 604 with the electroforming process is that the electroforming process exhibits great repeatability while holding extremely tight tolerances even for complex geometries.

The region 606 enclosed by dashed lines in FIG. 6 represents an illustrative overlap region on top of which the second abrasion resistant strip 604 is disposed. In the cross-sectional view FIG. 6B as well as the close-up view FIG. 6C, the overlap region 604 is shown as a slant line segment which indicates that the overlap region includes a slanted, flat surface in these embodiments illustrated in FIGS. 6B-C. Nonetheless, it shall be noted that the the description and illustration of an illustrative overlap region as a flat surface in these embodiments and figures is not intended to and shall not be interpreted to limit the scope of other embodiments including non-planar overlap region or the scope of the claims, unless otherwise specifically recited or claimed.

Another advantage of using the electroforming process to fabricate an inseparable, unitary abrasion resistant strip is that the electroformed second abrasion resistant strip section 604 may be molecularly bonded or otherwise attached to the overlap region 608 of the first abrasion resistant strip section 602. Therefore, the inseparable, unitary abrasion resistant strip exhibits much better mechanical properties (e.g., strength, etc.) with a much lower probability of joint failure. Another advantage of using the electroforming process to fabricate the second abrasion resistant strip section 604 is that the electroforming process is well known to be capable of producing near mirror finish, which greatly improves the fluid dynamic efficiency (e.g., reducing drag) without requiring or using one or more additional manufacturing processes to achieve the same fluid dynamic efficiencies. In some embodiments, the overlap region may include a slanted surface or other geometric profiles (e.g., a convex or concave surface) to increase the area to which the second abrasion resistant strip section 604 is attached.

Figure 7:
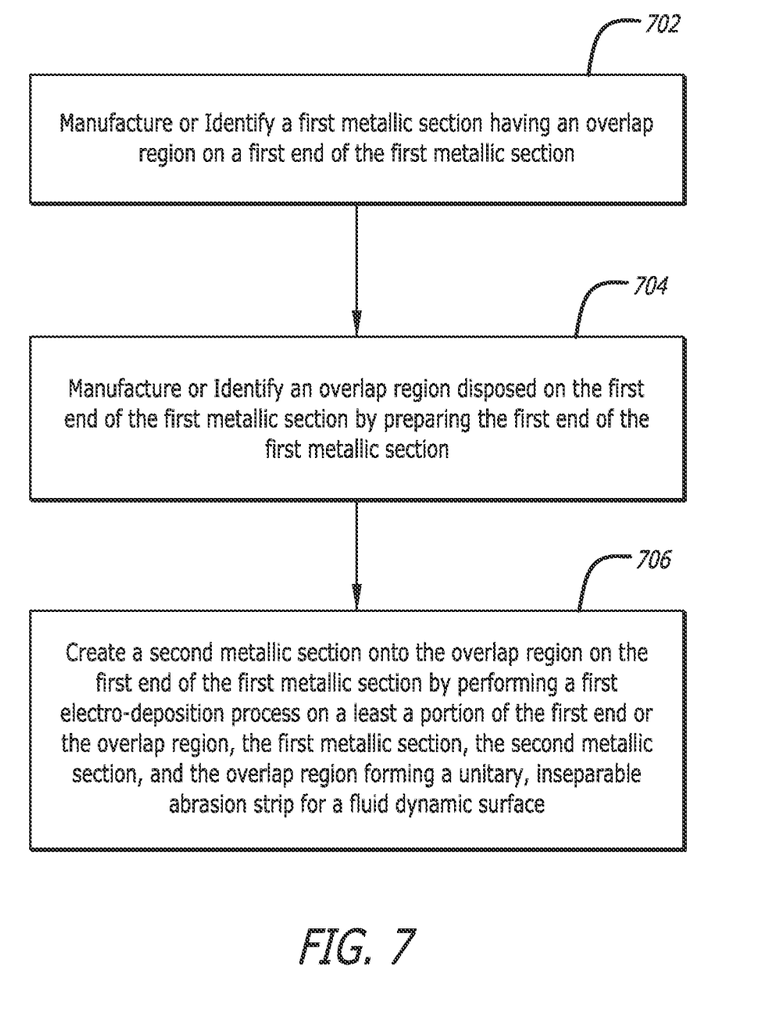
FIG. 7 illustrates a high-level flow diagram for a method for making a unitary abrasion strip in accordance with at least one embodiment described in this application.

FIG. 7 illustrates a high-level flow diagram for a method for making a unitary abrasion strip in accordance with at least one embodiment described in this application. In these embodiments illustrated in FIG. 7, the method may first manufacture (if non-existing) or identify (if pre-existing) a first metallic section that includes an overlap region on a first end of the first metallic section at 702. In some of these illustrated embodiments, the first metallic section may be made of a material that includes, for example, steel or carbon steel with carbon content up to 2.1%, Iron-based alloys such as Iron-Cobalt alloys (Fe—Co), Nickel-Cobalt (Ni—Co) alloys including zero (0) to twenty (20) percent of Cobalt, Nickel (Ni), Nickel-based alloys such as soft Nickel alloys including Iron-Nickel allow (Fe—Ni), hard Nickel alloys including or Boron-Nickel (B—Ni) alloys, or any other abrasion or corrosion resistant materials, etc.

At 702, the method may manufacture or identify an overlap region that is disposed on the first end of the first metallic section. In some embodiments, the method may identify or manufacture the overlap by at least preparing the first end of the first metallic section. The overlap region of the first metallic section may include a planar surface or hyper-surface (e.g., a convex or a concave surface) on one end of the first metallic section in some embodiments. In some other embodiments, the overlap region may include a body of materials formed on one end of the first metallic section. For example, the overlap region may include Nickel or other metal that is formed on one end of the first metallic region by, for example, electroplating process. Therefore, the overlap region may include the same material as or a different material from the first metallic section.

As previously described with reference to FIGS. 6A-C, the method may fabricate the overlap region by using the electroplating process to plate a layer of metal of a certain thickness onto a surface of the first metallic section (e.g., the overlap region 608 in FIG. 6C). In some embodiments, the method manufactures the overlap region onto an interface surface of the first metallic section to enhance the surface properties of the interface surface. For example, the method may electroplate a layer of Nickel onto an interface surface on a steel first metallic section to enhance one or more surface properties including, for example, abrasion or wear resistance, ability for bounding or adhering to another metallic section having a heterogeneous material than the first metallic section, surface finish of the interface on the first metallic section, etc.

The thickness of such a layer of metal may be tens of nanometers to treat the surface or enhance the surface properties of the surface of the first metallic section for receiving another metallic section (e.g., the second metallic section as described in 706). The overlap region may thus include a thin layer (e.g., tens of nanometers) or a substantial structural member having sufficient thickness and sizes so the overlap region may have the mechanical strength to support itself. At 706, the method may manufacture a second metallic section onto at least a portion of the overlap region on the first end of the first metallic section. In some embodiments, the method manufactures the second metallic section by at least performing a first electro-deposition process on at least a portion of the first end of the first metallic section or at least a portion of the overlap region. In some embodiments, the first electro-deposition process includes an electroforming process that uses an electrolytic bath (e.g., a sulfate-chloride bath or other suitable electrolytic baths) to produce the second metallic section onto the overlap region to produce an inseparable, unitary abrasion resistant strip. The geometric profiles of the abrasion resistant strip may be devised to fit or conform to some external dimensions of a blade such that the finished blade assembly including the abrasion strip includes fluid dynamic surfaces to enhance the fluid dynamic behavior or efficiency. In some of these illustrated embodiments, the second metallic section may thus be fabricated without using any metal forming processes that do not involve electro-deposition and include, for example, rolling, extrusion, forging, casting, bending, etc. With the ability to achieve smooth surface finish and to hold tight tolerances (e.g., a few nanometers to tens or hundreds of micrometers) as formed, the second metallic section may even be fabricated with the second electro-deposition process and/or the first electro-deposition process into the final form without any additional machining.

Figure 7A:
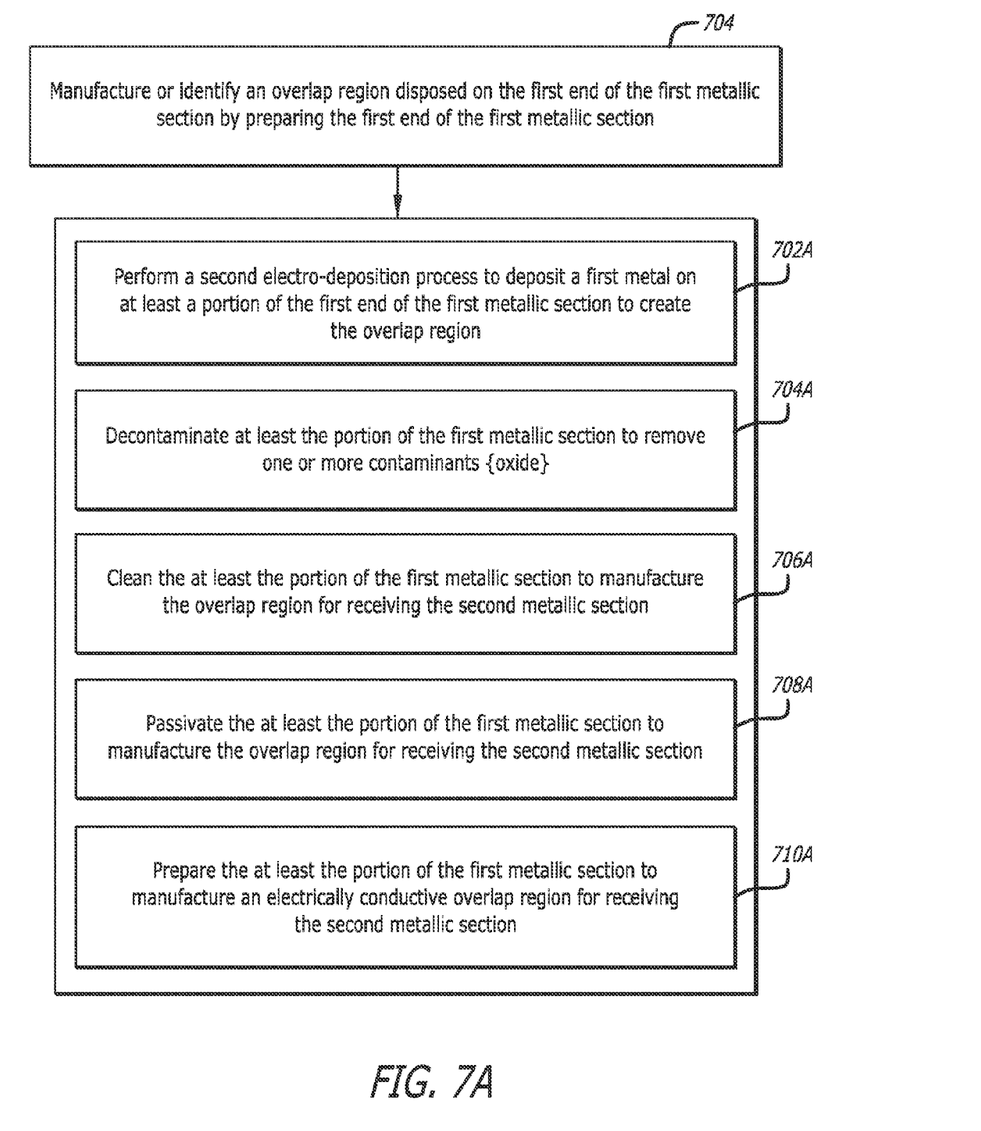
FIG. 7A illustrates more details about a process in the method illustrated in FIG. 7 in some embodiments.

FIG. 7A illustrates more details about a process in the method illustrated in FIG. 7 in some embodiments. More specifically, FIG. 7A illustrates more details about the process of manufacturing or identifying an overlap region by preparing the first end of the first metallic section. In these illustrated embodiments, the process may perform a second electro-deposition process to deposit a first metal on at least a portion of the first end of the first metallic section to manufacture and create the overlap region at 702A. In some of these illustrated embodiments, the second electro-deposition process includes an electro-plating process. For example, process 704 may electro-plate a layer of Nickel onto an interface surface (e.g., the overlap region 608 in FIG. 6C) to overlay the layer of Nickel onto an end portion of a steel first metallic section.

The process may also decontaminate at least a portion of the first metallic section at 704A (e.g., the portion near the interface between the first and the second metallic sections) to enhance the metallic bonding between the first metallic section and the second metallic section in subsequent manufacturing process(es) such as the electro-plating or electro-forming process. In some of these embodiments, the first metallic section and the second metallic section are joined together without using any mechanical fasteners, adhesive, glue, cement, paste, or any other material that includes one or more forms of chemicals and is applied to the interface to bind the first and second metallic sections together. In addition or in the alternative, the first metallic section and the second metallic section are joined together without using any metal joining process including melting a filler metal to fill a space between the first and the second metallic sections to join these two metallic sections together. The metal joining processes may include, for example, brazing, welding, soldering, diffusion bonding, etc. The at least a portion of the first metallic section may be decontaminated by using, for example, one or more chemical decontaminating processes using chemicals, solvents, deionized water, mechanical decontamination processes (e.g., light abrasive blasting), or any combinations thereof. In addition or in the alternative, the process may further clean at least a portion of the first metallic section receiving the second metallic section at 704A to remove materials that may impede subsequent metal forming processes (e.g., electroplating or electroforming) for creating the second metallic section onto the first metallic section.

For example, the process may use chemical or mechanical methods to remove native oxides, debris, residual machining fluids, or any other undesirable materials from the portion of the first metallic section receiving the second metallic section. The process may optionally passivate at least a portion of the first metallic section at 708A such that the portion becomes less affected by external factors (e.g., rusting from water) without affecting the electrical conductivity of the portion for subsequent manufacturing processes (e.g., electro-plating or electroforming). In some embodiments, the process may further prepare at least a portion of the first end of the first metallic section to manufacture an electrically conductive overlap region for receiving the second metallic section.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

I claim:

1. A method for making a unitary abrasion strip for a fluid dynamic surface, comprising:
   manufacturing a first metallic section;
   manufacturing an overlap region disposed on a first end of the first metallic section by preparing the first end of the first metallic section,
   wherein the overlap region extends over only a portion of the first metallic section; and
   creating a second metallic section onto the overlap region on the first end of the first metallic section by performing a first electro-deposition process on the first end of the first metallic section, wherein the first metallic section, the overlap region, and the second metallic section together form a unitary abrasion strip for a fluid dynamic surface,
   wherein a region of the second metallic section is not in contact with a region of the first metallic section.

2. The method of claim 1, wherein the act of manufacturing an overlap region comprises at least one of:
   performing a second electro-deposition process to deposit a first metal on the portion of the first end of the first metallic section to create the overlap region;
   decontaminating the portion of the first metallic section to remove one or more contaminants; and
   preparing the portion of the first metallic section to manufacture the overlap region for receiving the second metallic section.

3. The method of claim 2, wherein the second electro-deposition process comprises an electroplating process.

4. The method of claim 2, wherein the first metal comprises at least one of nickel and a nickel-cobalt based alloy.

5. The method of claim 1, wherein the first metallic section comprises one of an iron-based alloy or a titanium-based alloy.

6. The method of claim 1, wherein the second metallic section comprises one of nickel, a nickel-based alloy, or a nickel-cobalt based alloy.

7. The method of claim 1, wherein the first electro-deposition process comprises an electroforming process.

8. The method of claim 1, wherein the first metallic section is manufactured to a first geometric profile that substantially conforms to a first portion of the fluid dynamic surface, the second metallic section is manufactured to have a second geometric profile that substantially conforms to a second portion of the fluid dynamic surface, and the fluid dynamic surface comprises one or more surfaces on a rotatory blade that converts energy from fluid flow into propulsion power for a craft having the rotatory blade.

9. The method of claim 8, wherein the rotatory blade comprises one of a rotorcraft blade, an impeller blade, and a windmill blade.

10. The method of claim 1, wherein the second metallic section is created onto the first metallic section and has a geometric profile that is fabricated within a tolerance range between less than ten nanometers to tens of micrometers.

\* \* \* \* \*